United States Patent [19]
Li et al.

[11] Patent Number: 5,934,229
[45] Date of Patent: Aug. 10, 1999

[54] DOUBLE CIRCULAR SLIDER CRANK RECIPROCATING PISTON INTERNAL COMBUSTION ENGINE

[75] Inventors: Ming Li; Zhengzhong Li, both of Beijing, China

[73] Assignee: Liao Ning Daan Internal Combustion Engine Institute, Liaoning, China

[21] Appl. No.: 08/983,011

[22] PCT Filed: Jun. 13, 1996

[86] PCT No.: PCT/CN96/00043

§ 371 Date: Aug. 19, 1998

§ 102(e) Date: Feb. 20, 1998

[87] PCT Pub. No.: WO96/41937

PCT Pub. Date: Dec. 27, 1996

[30] Foreign Application Priority Data

Jun. 13, 1995 [CN] China .................................. 95111403

[51] Int. Cl.$^6$ .................................................. F02B 75/22
[52] U.S. Cl. .................... 123/55.5; 123/55.7; 123/192.2; 123/197.2; 123/197.3; 123/197.4
[58] Field of Search ................... 123/55.5, 55.7, 123/197.3, 197.2, 192.2, 197.4

[56] References Cited

U.S. PATENT DOCUMENTS

| | | |
|---|---|---|
| 3,258,992 | 7/1966 | Hittell . |
| 3,311,095 | 3/1967 | Hittell . |
| 4,078,439 | 3/1978 | Notario ........................................ 74/53 |
| 4,485,768 | 12/1984 | Heniges ................. 123/48 B |
| 5,067,456 | 11/1991 | Beachley et al. . |
| 5,375,566 | 12/1994 | Brackett ................. 123/55.5 |
| 5,503,038 | 4/1996 | Aquino et al. ............... 74/49 |
| 5,782,213 | 7/1998 | Pedersen ................. 123/55.2 |
| 5,865,060 | 2/1999 | Osborne .................. 74/49 |

FOREIGN PATENT DOCUMENTS

| | | |
|---|---|---|
| 85 1 00358 | 8/1986 | China . |
| 86 2 10915 U | 10/1986 | China . |
| 2076608 U | 5/1991 | China . |

OTHER PUBLICATIONS

"An Internal Combusion Engine Without Crank–Connecting Rod"; by the Japanese Institute of Technology, Nov. 1981.

*Primary Examiner*—Henry C. Yuen
*Assistant Examiner*—Hai Huynh
*Attorney, Agent, or Firm*—Burns, Doane, Swecker & Mathis, LLP

[57] ABSTRACT

The invention relates to a internal-combustion engine, particularly to a reciprocating piston type internal combustion engine having a crank circular slide block which replaces the connecting rod. It comprises the cylinder body; the cylinder, the piston, the crankshaft and the crank circular slide block mechanism with a circular slide block (27) which connects the piston with the crankshaft; a valve actuating mechanism; and a fuel supply system. In the cylinder body there are provided a dynamic balance sliding piece which moves reciprocatingly along a sliding track and a circular slide block (28) which connects the dynamic balance sliding piece with the crankshaft and has 180 degree of phase difference related to the circular slide block and is formed integrally with the circular slide block. The sliding track and the dynamic balance sliding piece can be formed as the structure of cylinder and piston. The dynamic equilibrium performance of the engine according to the invention is excellent, stable in operation, compact in structures, and its volume and weight can be reduced 50–67% elements of the engine can be easily manufactured and most of them are identical to those of the conventional engine and the fuel consumption of the engine is lower.

10 Claims, 9 Drawing Sheets

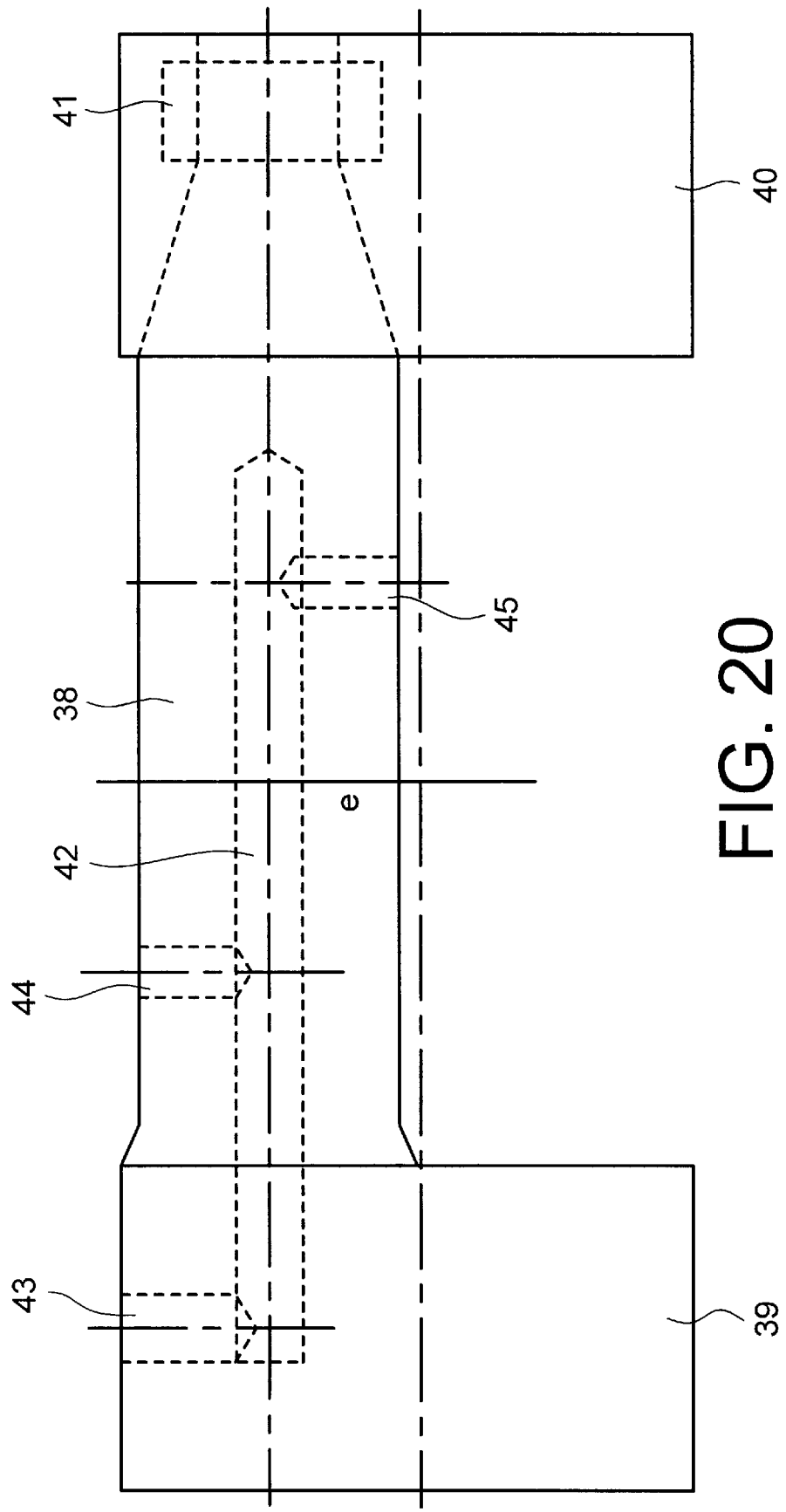

DOUBLE CIRCULAR SLIDER CRANK RECIPROCATING PISTON INTERNAL COMBUSTION ENGINE

TECHNICAL FIELD

The invention relates to an internal combustion engine, particularly relates to a reciprocating piston type internal combustion engine having a crank-dual circular slide block mechanism, in which the connecting rod is replaced by a circular slide block(s).

BACKGROUND OF INVENTION

In the existing reciprocating piston type internal combustion engine, a crank-connecting rod is used to achieve reciprocating movement of the piston. In order to overcome shortcomings of the crank-connecting rod mechanism, such as the reciprocating inertial force, several kinds of engine have been developed. One of them is a reciprocating piston type internal combustion engine with a crank circular slide block, in which the crank-connecting rod is replaced by a circular slide block(s). "An internal combustion engine without crank-connecting rod" developed by the Japanese Institute of Technology disclosed in "The internal combustion Engine", No 8, 1981, wherein the cylinders are arranged as a cross and the accident frequently occurs because the lubricating oil tends to enter the top portion of the piston. In addition, it was proposed that the structure of the sun gear system was arranged to the crank circular slide block mechanism in order to solve the equilibrium problem. However, it is difficult for that structure to be widely used because of its complicated structure. In an internal combusion engine with a crank circular slide block filed by the applicant, disclosed in CN85100358A issued by the Chinese Patent Office, a single circular slide block cooperating with a pair of inner gear transmiting pair is used. Its structure is quite simple, its weight is lower, but its dynamic equilibrium performance is still not perfect.

In veiw of these reasons, the purpose of present invention is to provide a reciprocating piston type internal combusion engine having a crank-dual circular slide block mechanism, which has very good eqilibrium performance and reliability and can save fuel and is simple in structure, smaller in volume and lower in weight.

SUMMARY OF INVENTION

The reciprocating piston type internal combusion engine having a crank-dual circular slide block mechanism according to the invention (see the accompanying drawings) comprises the cylinder body in which a crank-circular slide mechanism which consists of a cylinder(s), a piston(s), a crankshaft and a circular slide block which is rotatbly mounted in a circular opening of the piston and its eccentric axle hole is sleeved on the crankshaft; a valve actuating mechanism; and a fuel supply system. In the cylinder body there are provide a dynamic balance sliding piece which moves reciprocatingly along a sliding track and a circular slide block (28) which is rotatably mounted in a circular opening in the dynamic balance sliding piece which has 180 degree of phase difference related to said circular slide block (27) and is formed integrally with the slide block (27), and the eccentric axle hole of which sleeved on the crankshaft.

The piston (13) can be a double-acting piston which can do work on both sides; The sliding track (26) can be spatially perpendicular to the cylinder (8), whereby a laterally arranged I-shaped horizontal type double-cylinder engine can be formed.

The piston (50) can be a double-acting piston which can do work on both sides; The dynamic balance sliding piece (52) can be a single-acting piston which can do work on one side; The sliding track (51) can be a cylinder structure and be spatially perpendicular to the cylinder (49), whereby an inverted T-shaped type three-cylinder engine can be formed.

Both the cylinder (61) and the dynamic balance sliding piece (62) can respectively be a single-acting piston which can do work on one side; The sliding track (60) can be a cylinder structure and be spatially perpendicular to the cylinder (59), whereby a V-shaped type double-cylinder engine can be formed.

Both the shape and the size of the two circular slide blocks (27,28) can be identical, the eccentric distances(e) of their axle holes (29) is the same.

The eccentric distances (e) of the axle holes (29) in the circular slide blocks (27,28) is equal to the crank radius (e) of the crankshaft.

The two circular slide blocks (27,28) can be fixed by two positioning pins (35,36) to form an integral structure. They can also be fixed by other joint structure to form an integral structure.

The crankshaft (37) has a single-crank structure.

The crankshaft (37) has a combined structure which is formed by connecting one end of the crank pin (38) with the respective end of the main journal (40), whereby the circular slide blocks (27,28) can have an integral structure.

Also, The circular slide blocks can have combined structure which can be divided along the radial direction, whereby the crankshaft can have a integral structure.

Hereinafter the movement and equilibrium principle will be described with reference to FIGS. 5 and 6. In these figures, the rotation radius of the crankshaft and the crank pin, i.e. radius of the crank is e, and the rotation eccentric distance of both circular slide blocks 27 and 28 is e. The two slide blocks have 180 degree of phase difference to each other and they are connected to form a integral structure. One of circular slide block 27 drives the piston assembly to move reciprocatingly in an X direction, and the other circular slide block 28 drives the dynamics equilibrium slide block assembly to move reciprocatingly in a Y direction. the X direction is perpendicular to the Y direction. In the drawing, M1, M2, M3 indicate the displacement points of the center of crank pin 38 respectively. A1, A2, A3 indicate the displacement points of the center of circular slide block 27 and B1, B2, B3 indicate the displacement points of the center of circular slide block 28 respectively. When the crankshaft rotates at angular velocity of ω together with the crank pin, the circular slide blocks 27 and 28 rotate at angular velocity of—ω in the reverse direction. At this time, both the piston assembly and the dynamic balance sliding piece assembly move according to the cosine and the sine law. Suppose the movement time to be t. When ωt=0, positions of the crank pin 38, the circular slide blocks 27 and 28 are shown by double-dot dash lines and the positions of their centers are indicated by M1, A1 and B1, respectively. When the crank pin rotates to the angle of ωt, their positions are shown by single-dot dash lines and the positions of their centers are indicated by M2, A2 and B2, respectively. When ωt=90 degree, their positions are shown by solid lines and the positions of their centers are indicated by M3, A3 and B3, respectively.

The movement parameter of the piston assembly can be obtained by formulas as follows:

Displacement: Sx=2e(1−cos ωt)

Velocity: Vx=2eωsin ωt

Acceleration: $\alpha_x$=2e ω²cos ωt

The movement parameter of the dynamic balance sliding piece assembly can be obtained by formulas as follows:

Displacement: Sy=2e(1−sin ωt)

Velocity: Vy=−2eωcos ωt

Acceleration: $\alpha_y$=2eω²sin ωt

The movement forces of the invention are shown in FIG. 6. Suppose the mass of the piston assembly to be $m_1$, the mass of the dynamic balance sliding piece assembly to be $m_2$ and the mass of the equilibrium balance weight block to be m.

Movement inertial force of the piston assembly:

$$F_1=m_1 2e\omega^2 \cos \omega t$$

Movement inertial force of the dynamic balance sliding piece assembly:

$$F_2=m_2 2e\omega^2 \sin \omega t$$

Movement inertial force of the equilibrium balance weight block, such as flywheel $$F=mR\ \omega^2$$

When $m_1=m_2$, $F=F_1+F_2$ and $mR=m_1 2e=m_2 2e=K$, where K is a constant, it is easy to design the equilibrium balance weight block.

As described above, if the movement direction of the piston assembly is perpendicular to tie movement direction of the dynamic balance sliding piece assembly in the invention, their resultant force is the centrifugal force from the center of the crankshaft directing towards the center of the crank pin, so that a perfect dynamic equilibrium performance can be obtained according to the invention and it is not needed to add other auxiliary device, such as sun gear system.

Hereinafter the invention is further described with reference to the following embodiments and their accompanying drawings.

BRIEF DESCRIPTION OF DRAWINGS

FIG. 20 is a schematic veiw of the structure of a crankshaft in a combined manner according to the invention.

BEST MODE EMBODIED THE INVENTION

Embodiment 1

Figure 1:
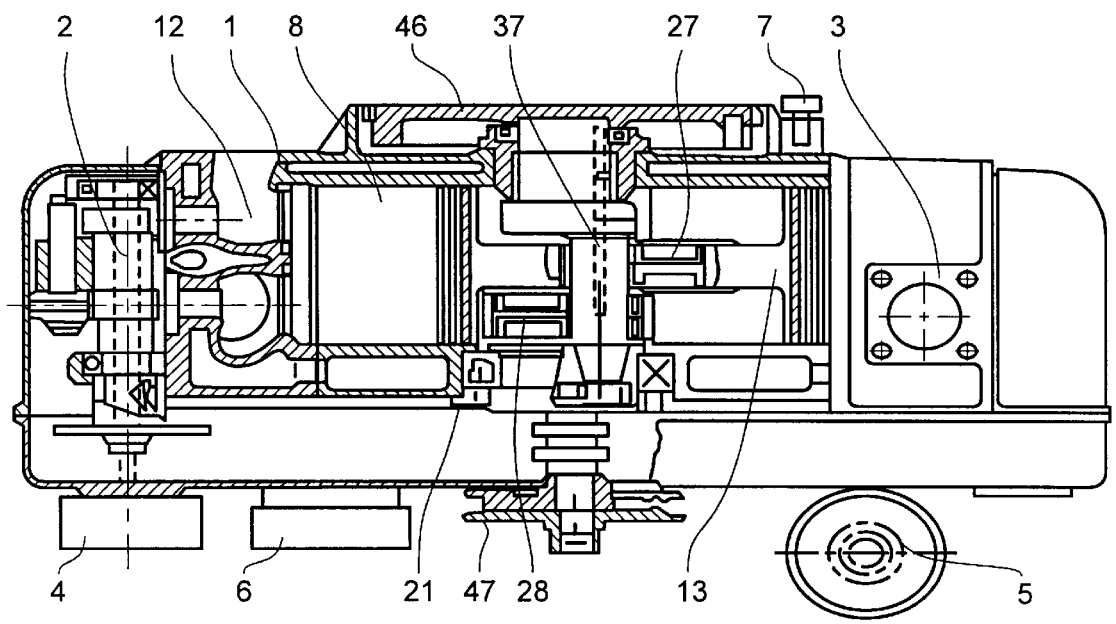
FIG. 1 is a schematic view of the configuration of a reciprocating piston type internal combustion engine having a crank-dual circular slide block mechanism according to the present invention, showing a double-cylinder engine arranged in an I-shaped horizontal form.

A reciprocating piston type internal combustion engine with a crank-dual circular slide block mechanism according to the invention is shown in FIGS. 1, 2, 5–7, 10–14 and 17–20. The embodiment is a double-cylinder engine arranged in an I-shaped horizontal form. The engine comprises a laterally arranged cylinder body 1, similar to the conventional structure; a valve actuating mechanism 2, a fuel supply system including a carburetor 3; a ignition system including a distributor 4; a lubrication system including an oil pump and filter 5; a cooling system including a water pump 6; a starting device including a starter 7; and the crank circular slide block mechanism. the respective portions as described above are used to compose a gasoline engine. When composing a diesel engine, some portions composed of a gasoline engine can be removed and some specific parts suitable to form a diesel engine can be added, for example, removing the carburetor and distributor and adding a injection pump respectively.

The crank circular slide block mechanism according to the invention is a crank-dual circular slide block mechanism which comprises a cylinder(s) in the cylinder body, a piston (s); a dynamic balance sliding piece, sliding track, two circular slide blocks, a crankshaft, a flywheel and a pulley and other parts.

Figure 7:
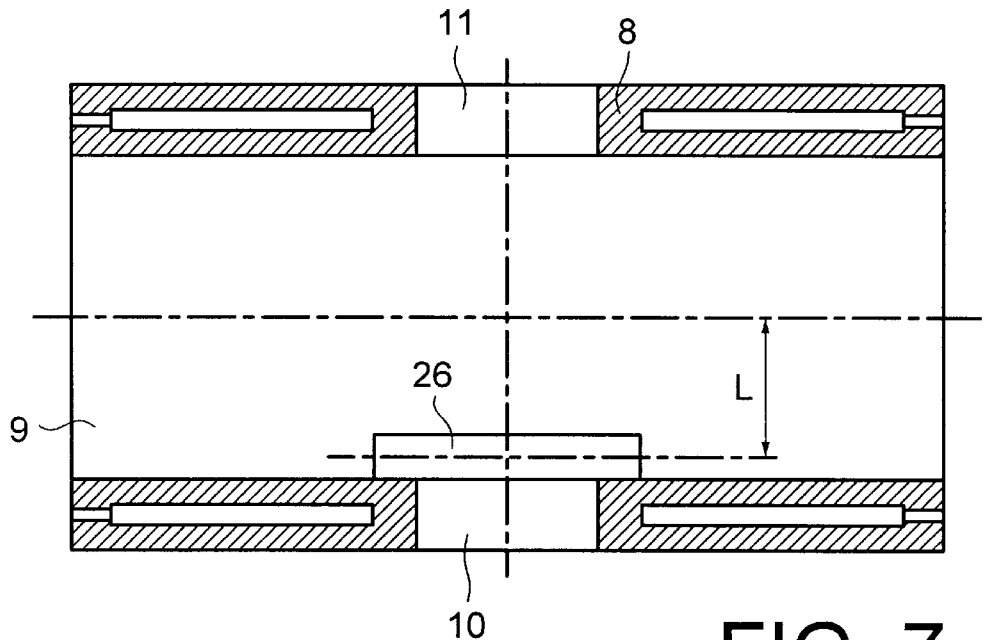
FIG. 7 is a schematic veiw of the structure of the cylinder 8 and the sliding track 26.
Figure 8:
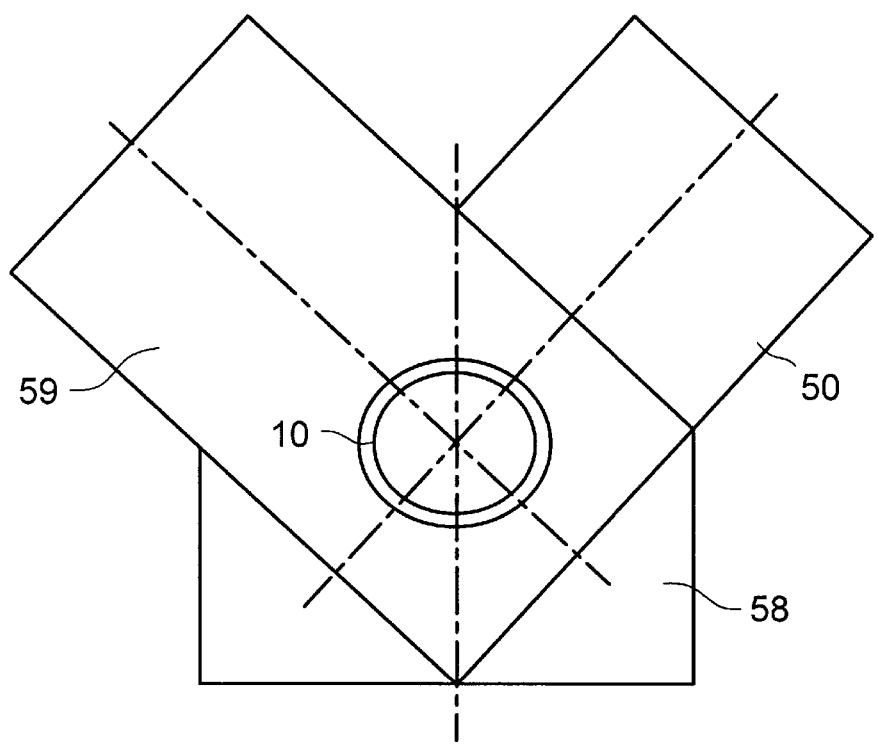
FIG. 8 is a schematic veiw of the structure of cylinder bodys of FIG. 4, wherein the cylinder body 59 is perpendicular to the sliding track body 60 and arranged in a V-shape form to each other.
Figure 9:
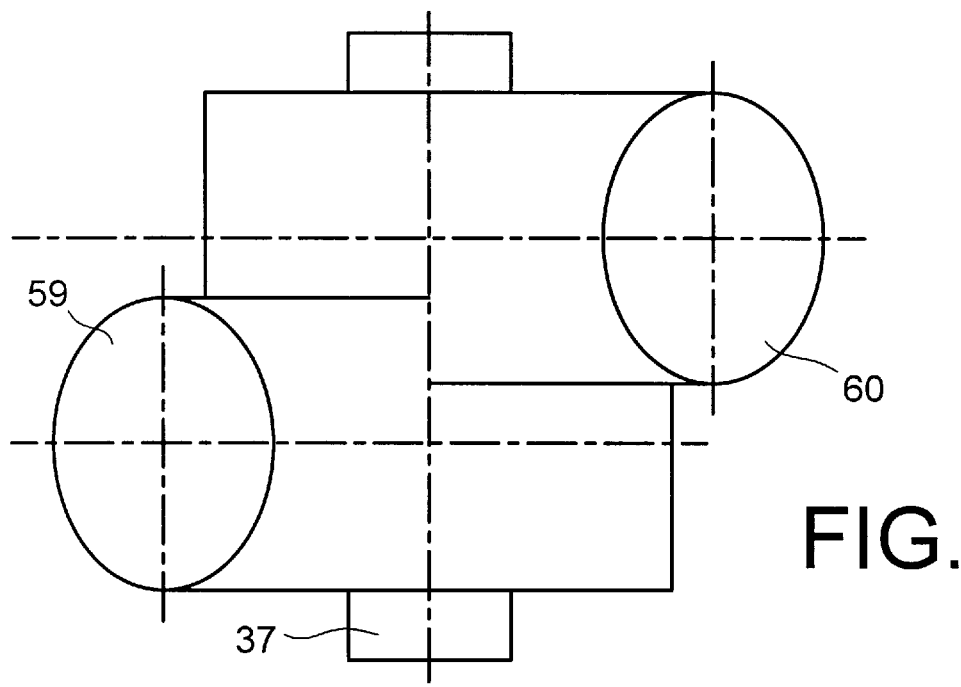
FIG. 9 is a schematic veiw of the structure viewed from above, showing two cylinders spatially perpendicular to each other and a crankshaft 37.

As shown in FIG. 7, the cylinder 8 is disposed in a cylinder bore 9 of a cylindrical cavity, two ends of which serve as the working portions. A cylinder liner can be arranged in the cylinder. The crankshaft bearing holes 10, 11 in which beatings can be mounted are laterally formed in the center of the cylinder. A cylinder head 12 is provided on the top of the cylinder.

Figure 10:
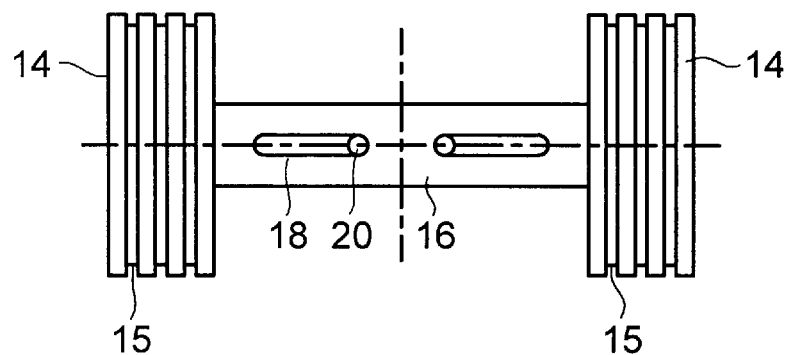
FIG. 10 is a schematic veiw of the structure of double-acting pistons 13 and 50 in FIGS. 2 and 3.
Figure 11:
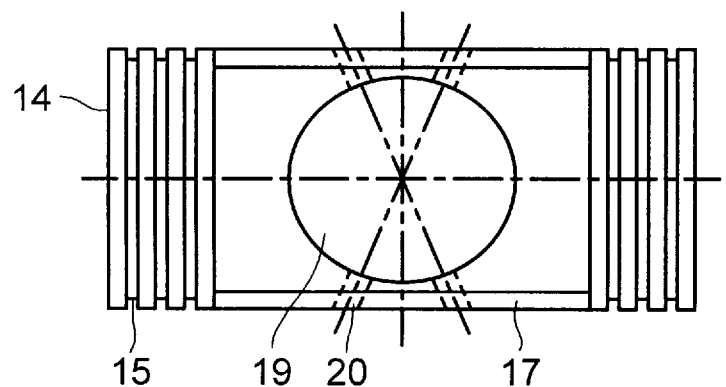
FIG. 11 is a schematic veiw of the structure viewed from above in FIG. 10.

As shown in FIGS. 10 and 11, the piston 13 has the double-acting structure. At either end the respective working portion 14 is identical in shape and size and is cylindrical, and piston ring grooves 15 in which the piston rings are mounted are formed on the working portions. The middle portion of the piston is a guiding portion 16 which is formed as a flat body and the guiding surface 17 of which fits the cylinder. Oil grooves 18 are formed along the guiding surface. A circular opening 19 is laterally formed in the center of the guiding portion. Oil holes 20 are formed between the circular opening 19 and oil grooves 18. A sliding bearing is provided in the circular opening.

Figure 12:
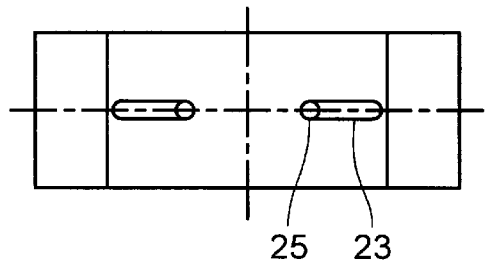
FIG. 12 is a schematic veiw of the structure of the dynamic balance sliding piece 21 in FIG. 2.
Figure 13:
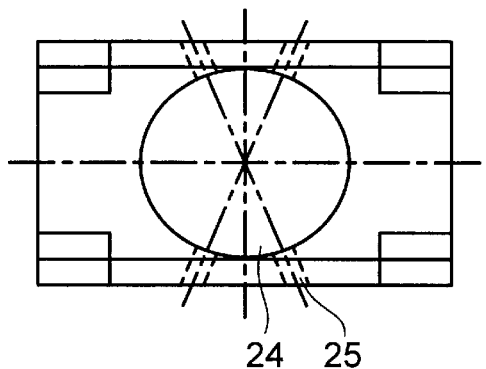
FIG. 13 is a schematic veiw of the structure viewed from above in FIG. 12.
Figure 14:
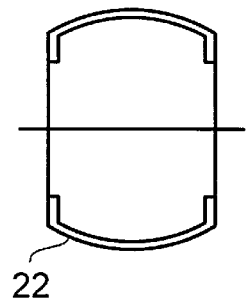
FIG. 14 is a schematic veiw of the structure viewed from left in FIG. 13.

As shown in FIGS. 12, 13 and 14, the dynamic balance sliding piece 21 comprises a flat elongated body. Guiding portions 22 are provided at its two symmetrical side edges and has an arc cylindrical surface shape at either edge. Oil groove 23 is formed along the respective cylindrical surface. A circular opening 24 is laterally formed in the center of the flat elongated body. Oil holes 25 are provided between the circular opening 24 and oil groove 23. A sliding bearing is provided in the circular opening.

Figure 2:
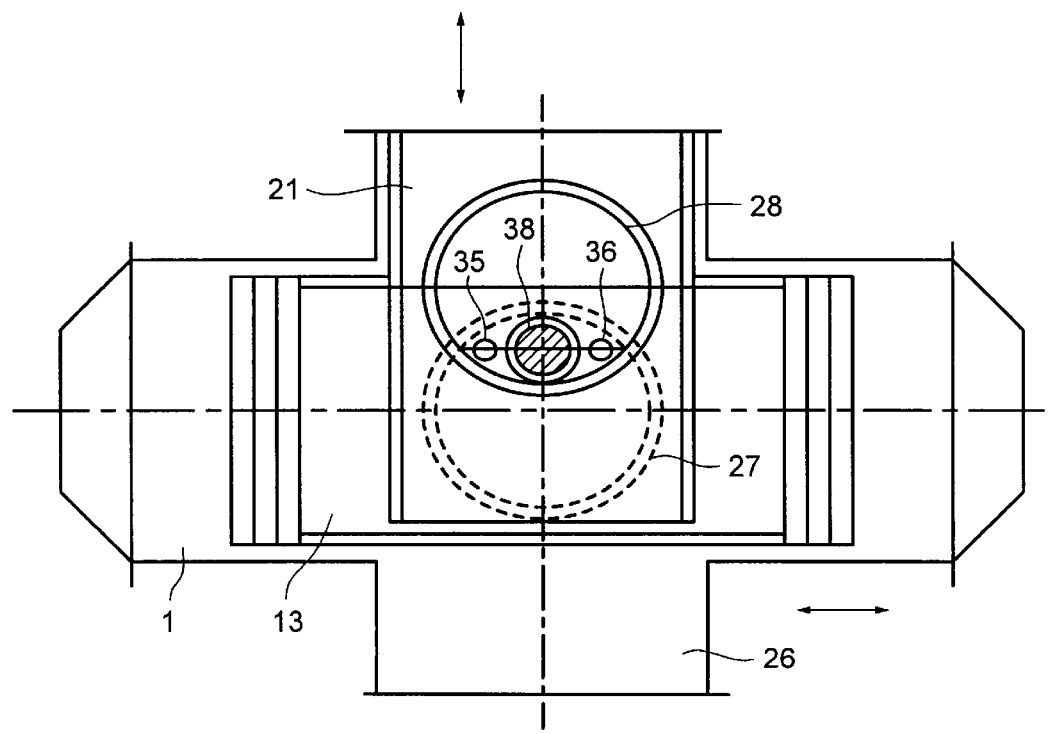
FIG. 2 is a schematic view of the simplified structure of a crank-dual circular slide block mechanism of FIG. 1, showing a double-acting piston 13 and its circular slide block27, a dynamic balance sliding piece 21 and its circular slide block 28, as well as a crank pin 38.
Figure 3:
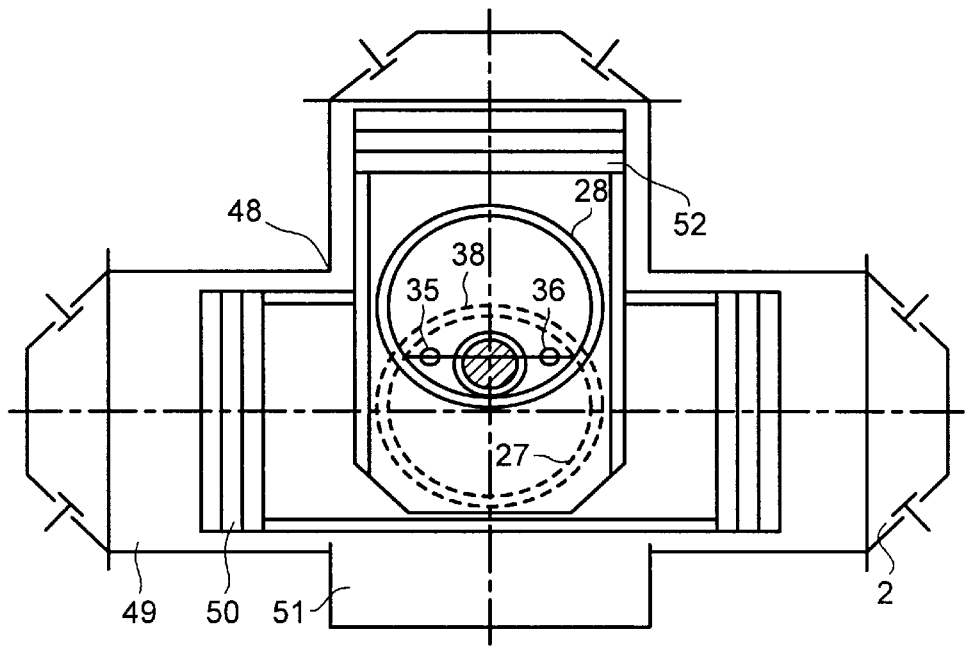
FIG. 3 is a schematic view of a simplified configuration of a reciprocating piston type internal combustion engine with another crank-dual circular slide block mechanism according to the present invention, showing a three-cylinder engine arranged in an inverted T-shape, in which the dynamic balance sliding piece 52 has a piston with single-sided structure.
Figure 4:
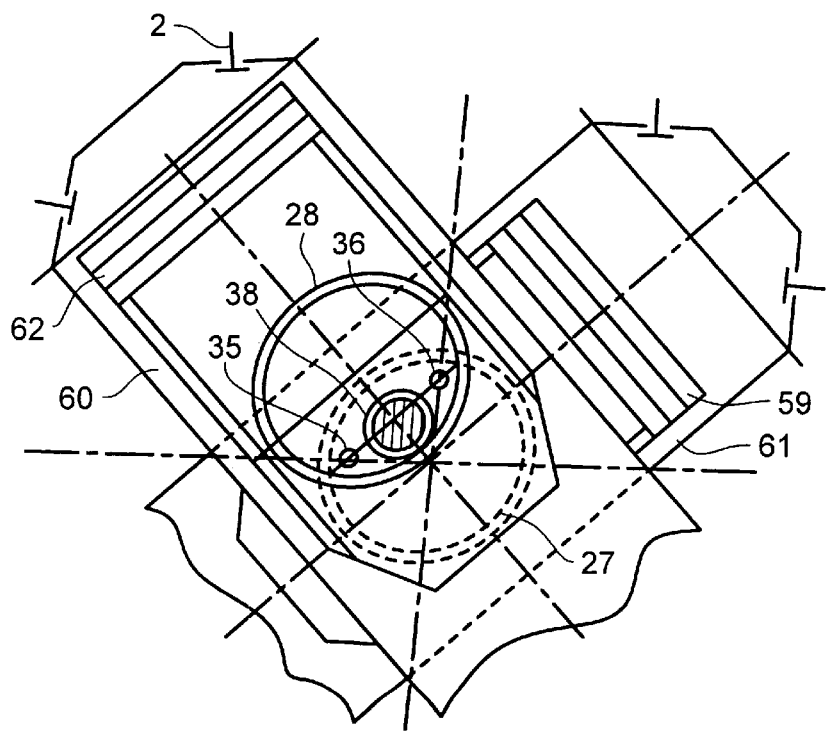
FIG. 4 is a schematic view of a simplified configuration of a reciprocating piston type internal combustion engine with a further crank-dual circular slide block mechanism according to the present invention, showing a double-cylinder engine arranged in a V-shape and its piston 61 is a single-acting piston, in which the dynamic balance sliding piece 62 has a single-sided piston structure.

As shown in FIGS. 2 and 7, the sliding rack 26 is a cavity formed in the cylinder body 1. The cross section shape of the hollow chamber corresponds to that of the dynamic balance sliding piece 21. The central line of the sliding track is perpendicular to the axis of the cylinder and they are spaced by the suitable distance L to each other. The distance L can be determined dependent on the thickness of the guiding portion of the cylinder and the dynamic balance sliding piece.

Figure 17:
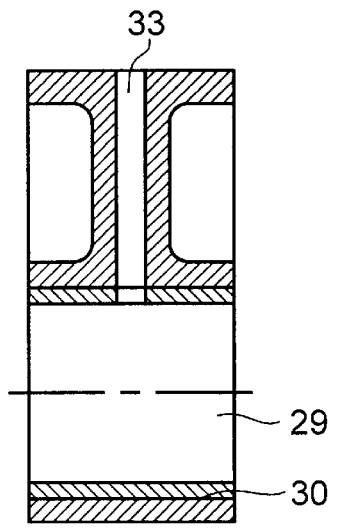
FIG. 17 is a schematic veiw of the structure of a circular slide block according to the invention, showing a integrally formed structure.
Figure 18:
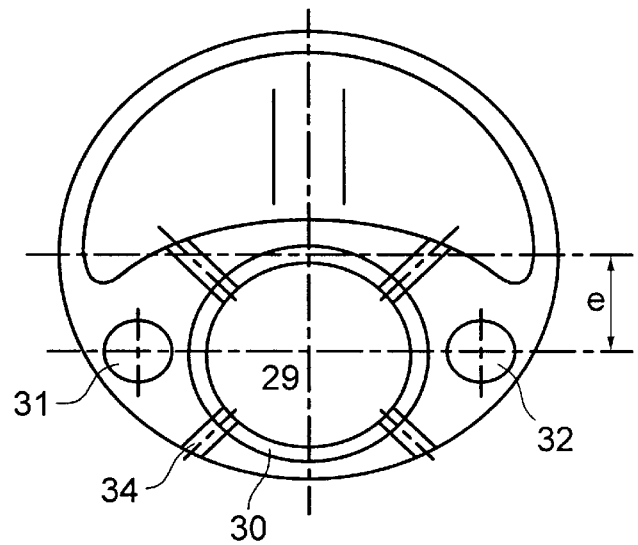
FIG. 18 is a schematic veiw of the structure viewed from left in FIG. 17.
Figure 19:
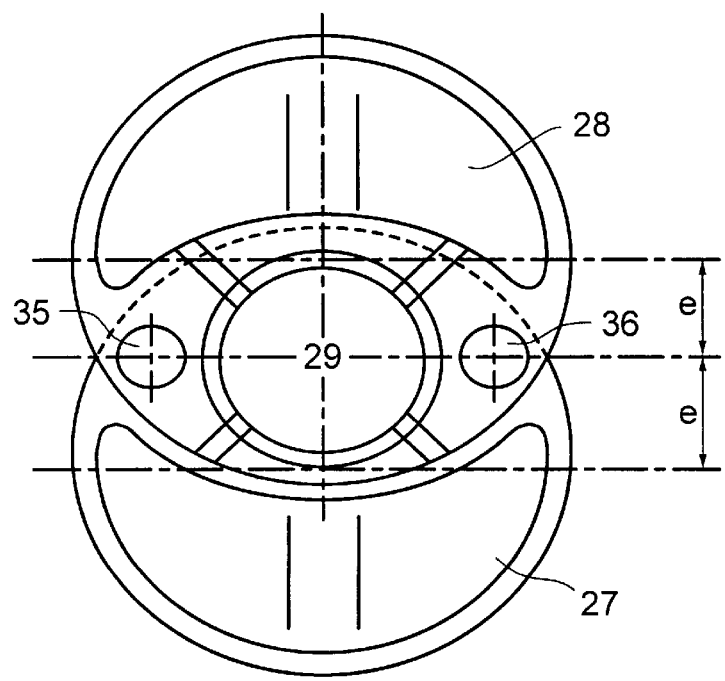
FIG. 19 is a schematic veiw of the structure of the dual circular slide block which is integrally formed by combination of two circular slide blocks.

As shown in FIGS. 17 and 18, the two circular slide blocks 27, 28 have same shape and size. They are in a flat cylindrical body. In the middle portion of the body is provided an axle hole 29, the axis of which offsets a distance e from the axis of either slide block. An bearing bush 30 is mounted in the axle hole. On the two sides of the axle hole are axially provided two pin holes 31, 32 which are symmetrical to each other to the axis of axil hole. An oil hole 33 is provided from the axle hole of the circular slide block to the outer cylindrical surface. Cross-shaped oil grooves 34 which are connected to the axle hole are provided on two end surfaces of the circular slide block. The two circular slide blocks are fixed by inserting two positioning pins 35 and 36 into the pin holes 31, 32 and are formed as an integral configuration. The two pin holes are disposed so as to allow the phase difference of the two circular slide blocks to lie in 180 degree and two axle holes are aligned and fixed integrally to each other so that a dual circular slide block is constructed. The circular slide block can be formed as either a integral structure or a combined structure formed by connecting two half-circular slide blocks which are divided along the radial of axle hole of the circular slide block using conventional connection means.

As shown in FIG. 20, the crankshaft 37 has a single-crank structure. Its crank radius is equal to the eccentric distance of the axle hole in said circular slide block and both of them are e. The crank pin 38 of the crankshaft is formed as a integral structure with the main journal 39 at one end. The main journal 40 is mounted to the other end of the crank pin and they are fixed integrally by means of a conventional connection means 41. The radius of the main journal is larger than the diameter of the crank pin, so that all the crank pin 38 is covered by the main journal and the duplicated degree of the crank is 100%. In the center of the crank pin is provided an axial oil channel 42. A plurality of oil holes 43, 44, 45 are provided between the oil channel and the surface of the crank pin and between the oil channel and the surface of the main journal. The crankshaft is mounted within the crankshaft bearing holes 10, 11 in the cylinder body. The above-mentioned crankshaft has a combined structure which can fit with above-mentioned integral structure of the circular slide block. The crankshaft can also be formed as a integral structure which can fit with above-mentioned combined structure of the circular slide block.

During a dual circular slide block mechanism is assembled, the crank pin 38 of the crankshaft is inserted into the axle hole 29 of the dual circular slide block and two circular slide blocks are put into the circular opening 19 of the piston and circular opening 24 of the dynamic balance sliding piece, respectively. The flywheel 46 and pulley 47 used in conventional structure are mounted to two ends of the crankshaft 37.

When they are designed and manufactured, it is necessary to make two circular slide blocks 27 and 28 to have same weight and same position of gravity center. Furthermore, it is necessary to make the piston assembly and the dynamic balance sliding piece assembly to have same weight and to make their centers of gravity to be kept in their own central line. If needed, some counterbalances can be provided in the flywheel and pulley.

According to the present invention, a top-disposed cam type ZB-292 water cooling gasoline engine is formed. The cylinder diameter D=92 mm; the stroke of the piston S=70 mm; the power N=25 ps/3000 rpm; the torque Me=7 kgf-m/2000 rpm; the lowest fuel consumption rate ge=212 g/ps.h; the net weight W=70 kg; and the volume V=320×546×320 mm.

According to the present invention, a direct injector type ZB-2105 water cooling diesel engine is formed. The cylinder diameter D=105 mm; the stroke of the piston S=80 mm; the power N=25 ps/1600 rpm; the torque Me=11.5 kgf-m/1100 rpm; the lowest fuel consumption rate ge=180 g/ps.h; the net weight W=80 kg; and the volume V=380×620×350 nm.

According to the present invention, a bottom-mounted cam type ZB-293 water cooling gasoline engine is formed. The cylinder diameter D=93 mm, the stroke of the piston S=76 mm, the power N=36 ps/3600 rpm, the torque Me=7.6 kgf-m/2000 rpm, the lowest fuel consumption rate ge=210 g/ps.h, the net weight W=56 kg, and the volume V=320×580×320 mm.

The operation of the reciprocating piston type internal combustion engine having a crank dual circular slide block mechanism according to the above-mentioned embodiments of the present invention is same as that of existing internal combustion engines. In comparison with existing crank-connecting rod reciprocating piston internal combustion engines, by using the three internal combustion engines according to the above-mentioned embodiments, the fuel consumption is reduced 13–16%, the weight is reduced 50–60%, the volume is reduced 60–70%, the dynamic equilibrium performance is better, almost no vibration occurs at all, and the contaminant of the output is quite little which is only 5–10% of that of Japanese engine of same type.

Embodiment 2

Figure 15:
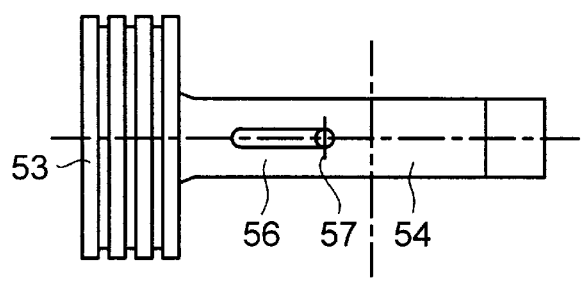
FIG. 15 is a schematic veiw of the structure of single-acting pistons 60, 61 and the dynamic balance sliding piece 52 in FIGS. 3 and 4.
Figure 16:
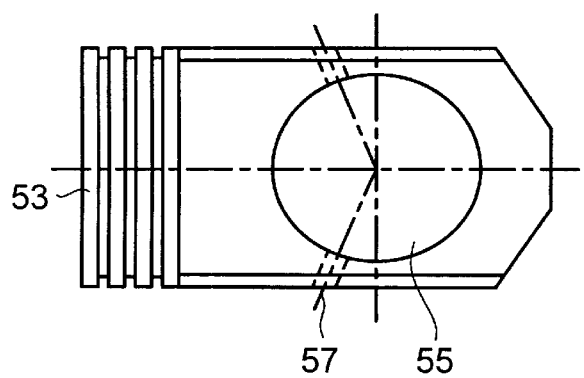
FIG. 16 is a schematic veiw of the structure viewed from above in FIG. 15.

As shown in FIGS. 3, 5, 6, 10, 15–20, another reciprocating piston type internal combustion engine with a crank-dual circular slide block mechanism according to the invention is illustrated. The embodiment is a three-cylinder engine in a inverse T-shape which the structure is generally same as that of the embodiment No. 1. It is characterized that the cylinder body 48 is generally an inverse T-shaped arrangement. The cylinder 49 is arranged laterally. A piston 50 is disposed in the cylinder 49, The structure of the piston is same as that in the embodiment No. 1 which is a double-acting piston. The structure of its sliding track 51 is same as that in the conventional cylinder. The sliding track is perpendicular to the axis of the cylinder 49. The dynamic balance sliding piece 52 in the sliding track is a single-acting piston, as shown in FIGS. 15 and 16. All structures of the working portion 53 at one end, the guide portion 54 at the other end, the circular opening 55, its oil groove 56 and the oil hole 57 of the piston are same as those of the corresponding parts of the double-acting piston in the embodiment No. 1.

The operation of the reciprocating piston type internal combustion engine with a crank-dual circular slide block mechanism according to the embodiment is same as that of the existing internal combustion engine.

Embodiment 3

Another reciprocating piston type internal combustion engine with a crank-dual circular slide block mechanism according to the invention is shown in FIGS. 4–6, 8, 9, 15–20. The embodiment is a double-cylinder engine in a V-shape forms. Its structure is generally same as that of the embodiment No. 2. It is characterized that the cylinder body 58 is generally a V-shaped arrangement. The cylinder 59 and the sliding track 60 in structure are same as those in the conventional cylinder which are arranged in a V-shaped manner and are perpendicular to each other. Their central lines is seperated by a proper distance to each other. The piston 61 and the dynamic balance sliding piece 62 in the embodiment have a single-sided piston structure, as shown in FIGS. 15 and 16.

According to the embodiment, a type ZBV-2E50F air cooling two-stroke gasoline engine is formed. The cylinder diameter D=50 mm; the stroke of the piston S=34 mm; the power N=7 ps/5000 rpm; the torque Me=0.85 kgf-m/3000 rpm; the lowest fuel consumption rate ge-340 g/ps.h; the net weight W=4.5 kg; and the volume V=126×108×122 mm.

According to the embodiment, a type ZBV-293F air cooling gasoline engine is formed. The cylinder diameter D=93 mm; the stroke of the piston S=76 mm; the power N=30 ps/3200 rpm; the torque Me=7.5 kgf-m/2300 rpm; the lowest fuel consumption rate ge=225 g/ps.hp; and the net weight W=48.5 kg.

The operation of the reciprocating piston type internal combustion engine having a crank-dual circular slide block mechanism according to the above-mentioned embodiments of the present invention is same as that of existing internal combustion engines. In comparison with existing crank-connecting rod reciprocating piston internal combustion engines, by using the two internal combustion engines according to the above-mentioned embodiments, the fuel consumption is reduced 8–13%, the weight is reduced 46%, the volume is reduced 55%.

Applicability in industry

In comparison with the existing art, the reciprocating piston type internal combustion engine having a crank-dual circular slide block mechanism according to the above-mentioned embodiments of the present invention has the following obvious advantages and effects:

1. The combined movement force of the piston assembly and the dynamic slide block assembly according to the invention is a cents force which passes through the centers of the crankshaft and the crank pin, so tat the ideal dynamic equilibrium can be obtained and the dynamic equilibrium performance is perfect.

2. The two circular slide blocks according to the invention are used to be combined integrally to replace the connecting rod of the existing crank-connecting rod mechanism, so that they are connected with the crankshaft to form the crank-dual circular slide block mechanism. The mechanism is connected with the piston and the dynamic balance sliding piece in transmission so as to permit the piston assembly and the dynamic balance sliding piece assembly which move in mutually perpendicular directions to move in a manner of restriction on each other to produce driving power. The mechanism cancels the inner gear transmitting pair which cooperates with the crank-single circular slide block mechanism to make the dynamic equilibrium performance of the invention to be excellent Furthermore, the number of the moving elements is reduced so that its structure is more compact and its operation is more reliable.

Figure 5:
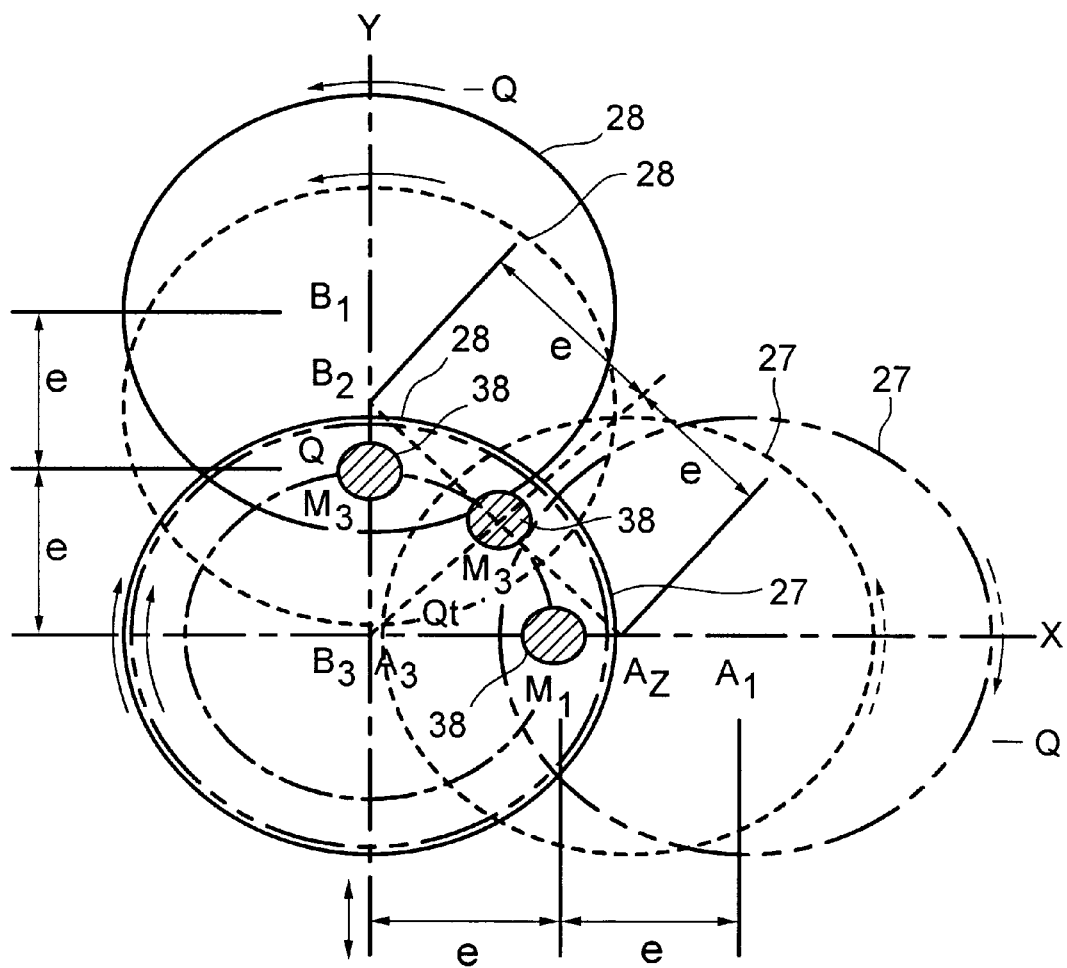
FIG. 5 is a schematic view of movement orbits of the two circular slide blocks 27, 28 and the crank pin 38 according to the invention.
Figure 6:
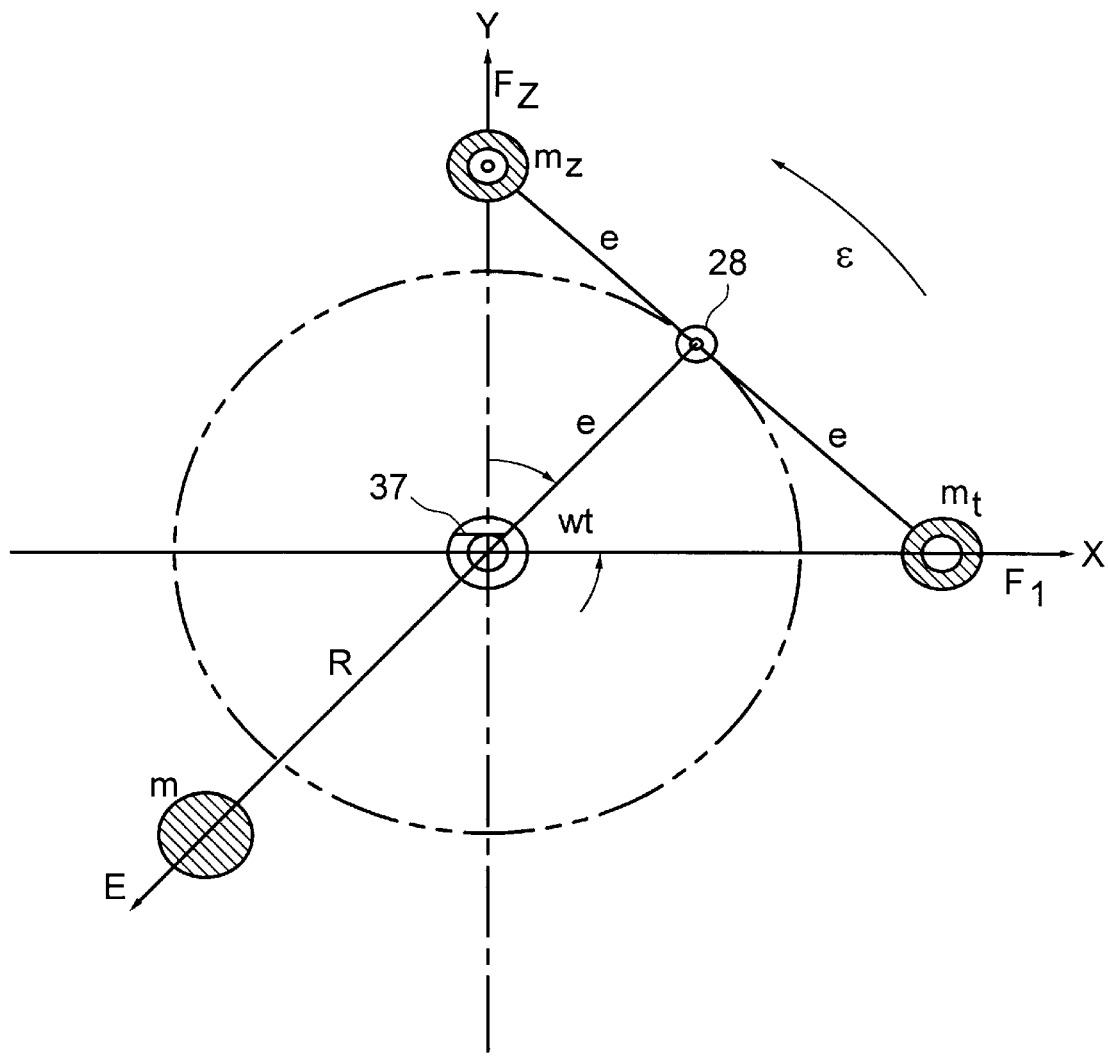
FIG. 6 is a view of the equilibrium relationship of the movement forces between the piston assembly and the dynamic balance sliding piece assembly according to the invention.

3. The total volume of the engine is reduced and the weight is also decreased because a crank-dual circular slide block mechanism is used in the invention. For the purpose of the illustration, suppose both of the crank radius and the eccentric distance of the circular slide block are identical to each other and the value in dimension is e. As shown in FIG. 5, the piston stroke of the invention is 4e while in the existing internal combustion engine of same type in which a crank-connecting roc mechanism is used, the piston stroke is merely 2e because the crank radius is e. Consequently, The volume and weight of the engine according to the invention can be reduced 50–67%.

4. According to the invention, the machining surfaces of the main movement elements, such as piston, circular slide block, crankshaft generally are cylindrical surfaces and planes, so that they are easy to be manufactured. Furthermore, more than 70% elements are same with those of the conventional engine, so that they are interchangeable, and have good inherent property.

5. In addition, the above-mentioned advantages of the invention make the engine to have less fuel consumption and higher use reliability.

We claim:

1. A reciprocating piston internal combustion engine having a crank-dual circular slide block, which comprises the cylinder body in which a crank circular slide block mechanism which consist of a cylinder(s), a piston(s), a crankshaft and a circular slide block which is rotatably mounted in a circular opening of the piston and its eccentric axle hole is sleeved on the crankshaft, a valve actuating mechanism, and a fuel supply system; characterized in that in said cylinder body there are provided a dynamic balance sliding piece which is moved reciprocatingly along a sliding track, and a circular slide block (28) which is rotatably mounted in a circular opening of the dynamic balance sliding piece and has 180 degree of phase difference related to said circular slide block (27) and is formed integrally with the slide block (27) and the eccentric axle hole of which is sleeved on the crankshaft.

2. A reciprocating piston internal combustion engine having crank-dual circular slide block according to claim 1, wherein said piston (13) is a double-acting piston which can do work on both sides; said sliding track (26) is spatially perpendicular to the cylinder (8).

3. A reciprocating piston internal combustion engine having crank-dual circular slide block according to claim 1, wherein said piston (50) is a double-acting piston which can do work on both sides; said dynamic balance sliding piece (52) can be a single-acting piston which do work on one side; said sliding track (51) is a cylinder structure and be spatially perpendicular to said cylinder (49).

4. A reciprocating piston internal combustion engine having crank-dual circular slide block according to claim 1, wherein both said cylinder (61) and dynamic balance sliding piece (62) are a kind of the single-acting piston which do work on one side; said sliding track (60) is a cylinder structure and be spatially perpendicular to said cylinder (59).

5. A reciprocating piston internal combustion engine having crank-dual circular slide block according to claim 1, wherein both shape and size of said two circular slide blocks (27,28) are identical, the eccentric distances (e) of their axle hole (29) are same.

6. A reciprocating piston internal combustion engine having crank-dual circular slide block according to claim 5, wherein the eccentric distances(e) of the axle hole (29) of said circular slide blocks (27,28) is equal to the crank radius (e) of the crankshaft.

7. A reciprocating piston internal combustion engine having crank-dual circular slide block according to claim 5, wherein said two circular slide blocks (27,28) are fixed by two positioning pins (35,36) to form a integral structure.

8. A reciprocating piston internal combustion engine having crank-dual circular slide block according to claim 5, wherein said crankshaft (37) has a single-crank structure.

9. A reciprocating piston internal combustion engine having crank-dual circular slide block according to claim 5, wherein one end of the crank pin (38) in said crankshaft (37) has a combined structure with the same end of the main journal (40).

10. A reciprocating piston internal combustion engine having crank-dual circular slide block according to claim 5, wherein said circular slide blocks (27,28) has combined structure which is divided along the radial direction.

* * * * *